US007899005B2

(12) United States Patent
Retana et al.

(10) Patent No.: US 7,899,005 B2
(45) Date of Patent: Mar. 1, 2011

(54) METHOD AND APPARATUS FOR PASSING ROUTING INFORMATION AMONG MOBILE ROUTERS

(75) Inventors: Alvaro Retana, Raleigh, NC (US); Yi Yang, Morrisville, NC (US); Abhay Roy, Santa Clara, CA (US); Alfred Lindem, III, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 454 days.

(21) Appl. No.: 11/531,259

(22) Filed: Sep. 12, 2006

(65) Prior Publication Data

US 2008/0062947 A1  Mar. 13, 2008

(51) Int. Cl.
 G01R 31/08 (2006.01)
 H04B 7/216 (2006.01)
(52) U.S. Cl. .......................... 370/328; 370/342
(58) Field of Classification Search .............. 370/328, 370/342
 See application file for complete search history.

(56) References Cited

U.S. PATENT DOCUMENTS

| | | | |
|---|---|---|---|
| 6,023,724 A * | 2/2000 | Bhatia et al. ............... 709/218 |
| 6,046,985 A | 4/2000 | Aldred et al. | |
| 6,314,105 B1 | 11/2001 | Luong | |
| 6,473,431 B1 | 10/2002 | Perlman et al. | |
| 6,519,231 B1 | 2/2003 | Ding et al. | |
| 6,654,359 B1 | 11/2003 | La Porta et al. | |
| 6,678,241 B1 | 1/2004 | Gai et al. | |
| 6,690,653 B1 | 2/2004 | Anbiah et al. | |
| 6,704,301 B2 | 3/2004 | Chari et al. | |
| 6,711,152 B1 | 3/2004 | Kalmanek et al. | |
| 6,721,290 B1 | 4/2004 | Kondylis et al. | |

(Continued)

FOREIGN PATENT DOCUMENTS

| | | |
|---|---|---|
| WO | WO 2007/117727 A2 | 10/2007 |
| WO | WO 2008/027668 A1 | 3/2008 |
| WO | WO 2008/033618 | 3/2008 |
| WO | WO 2008/067041 | 6/2008 |

OTHER PUBLICATIONS

Notification of Transmittal of the International Search Report and the Written Opinion of the International Searching Authority, or the Declaration (1 page), International Search Report (2 pages), and Notification of Transmittal of the International Search Report and the Written Opinion of the International Searching Authority, or the Declaration (3 pages) for International Application No. PCT/US07/74890 mailed Jan. 30, 2008.

J. Moy, Open Shortest Path First (OSPF) Version 2, Request for Comments, Apr. 1, 1998, p. 185 No. 2328, Publisher: Internet Engineering TaskForce, Published in: Internet (www.ietf.org).

(Continued)

*Primary Examiner* — Vincent P Harper
*Assistant Examiner* — Timothy Pham
(74) *Attorney, Agent, or Firm* — Patent Capital Group (57) ABSTRACT

A method and apparatus for sharing routing information include receiving first domain data that indicates domains of a first mobile router. A domain is a collection of routers that share uniform routing information at a particular level of detail. An inbound data packet is received from a second mobile router over a particular link. The inbound control plane packet lists second domain data that indicates domains of the second mobile router. The first domain data and the second domain data together include multiple domains. A particular domain is automatically selected from the first domain data and the second domain data. The second mobile router independently selects the same particular domain. The particular link is assigned to the particular domain; and routing information for the particular domain is shared between the first mobile router and the second mobile router over the particular link.

21 Claims, 5 Drawing Sheets

U.S. PATENT DOCUMENTS

| | | | |
|---|---|---|---|
| 6,721,344 | B2 | 4/2004 | Nakao et al. |
| 6,744,775 | B1 | 6/2004 | Beshai et al. |
| 6,826,621 | B1 | 11/2004 | Kephart et al. |
| 6,865,151 | B1 | 3/2005 | Saunders |
| 6,961,310 | B2 | 11/2005 | Cain |
| 6,963,575 | B1 | 11/2005 | Sistanizadeh et al. |
| 7,002,949 | B2 | 2/2006 | Garcia-Luna-Aceves et al. |
| 7,190,696 | B1 | 3/2007 | Manur et al. |
| 7,286,479 | B2 | 10/2007 | Bragg |
| 7,533,166 | B2 | 5/2009 | Beyda |
| 7,609,672 | B2 | 10/2009 | Retana et al. |
| 2001/0024443 | A1 | 9/2001 | Alriksson et al. |
| 2002/0075807 | A1 | 6/2002 | Troxel et al. |
| 2002/0101821 | A1 | 8/2002 | Feldmann et al. |
| 2002/0112060 | A1 | 8/2002 | Kato |
| 2003/0026268 | A1 | 2/2003 | Navas |
| 2003/0037168 | A1 | 2/2003 | Brabson et al. |
| 2003/0095554 | A1 | 5/2003 | Shimizu |
| 2003/0112799 | A1 | 6/2003 | Chandra et al. |
| 2003/0174653 | A1 | 9/2003 | Basu et al. |
| 2003/0218988 | A1 | 11/2003 | Han et al. |
| 2003/0223379 | A1 | 12/2003 | Yang et al. |
| 2004/0081154 | A1 | 4/2004 | Kouvelas |
| 2004/0085912 | A1 | 5/2004 | Xu et al. |
| 2004/0162819 | A1 | 8/2004 | Omae et al. |
| 2004/0196843 | A1 | 10/2004 | Zinin |
| 2004/0208175 | A1 | 10/2004 | McCabe |
| 2005/0030921 | A1 | 2/2005 | Yau |
| 2005/0047353 | A1 | 3/2005 | Hares |
| 2005/0074019 | A1 | 4/2005 | Handforth et al. |
| 2005/0089015 | A1 | 4/2005 | Tsuge et al. |
| 2005/0220077 | A1 | 10/2005 | Vereecke et al. |
| 2005/0221752 | A1 | 10/2005 | Jamieson et al. |
| 2006/0140111 | A1 | 6/2006 | Vasseur et al. |
| 2006/0159082 | A1 | 7/2006 | Cook et al. |
| 2006/0159095 | A1 | 7/2006 | Cook et al. |
| 2006/0165009 | A1 | 7/2006 | Nguyen et al. |
| 2006/0198321 | A1 | 9/2006 | Nadeau et al. |
| 2007/0019593 | A1 | 1/2007 | Sarkar |
| 2007/0053295 | A1 | 3/2007 | Cleveland et al. |
| 2007/0091795 | A1 | 4/2007 | Bonaventure et al. |
| 2007/0165532 | A1 | 7/2007 | Retana et al. |
| 2007/0214283 | A1 * | 9/2007 | Metke et al. ............. 709/245 |
| 2008/0002640 | A1 | 1/2008 | Westphal |
| 2008/0130500 | A1 | 6/2008 | Retana et al. |
| 2010/0008231 | A1 | 1/2010 | Retana et al. |

OTHER PUBLICATIONS

"NovaRoam: Dynamic Routing for Mobile Networks," 2000, 29 pages, novaroam.com/downloads/wp_tora.pdf, Nova Engineering, Inc., Cincinnati, Ohio, USA.

C. Small, "Radio Shortest Path First (RSPF) Specification, IV, Link state propagation," 2000, 9 pages, rspf.sourceforge.net/rspfspec4.html, Internet.

Park and Corson, "Temporally-Ordered Routing Algorithm (TORA) Version 1 Functional Specification," Jul. 20, 2001, 22 pages, ietf.org.draft-ietf-manet-tora-spec-04-IETF, Internet-Draft.

Kennicott and Fisk, "Dynamic Allocation of Nodes on a Large Space-shared Cluster," 2001, 23 pages, cacr.caltech.edu/cluster2001/program/talks/kennicott.pdf, CalTech, Pasadena, CA, US.

Kaya et al., "SQS: An Experimental Scalable Network Structure for Efficient Querying of Micro Sensors," 2003, 12 pages, cse.yeditepe.edu.tr/tnl/wisent/htmls/pubs/pubs/sqs.pdf, Istanbl.

Karp and Kung, "GPSR: Greedy Perimeter Stateless Routing for Wireless Networks," 2000, 12 pages, eecs.harvard.edu/networking/papers/karp-kung-gpsr-500.pdf, Harvard, Cambridge, MA, US.

Curran, "SWARM: Cooperative Reinforcement Learning for Routing in Ad-hoc Networks," 2003, 84 pages, cs.tcd.ie/publications/tech-reports/reports.03/TCD-CS-2003-6.pdf, Trinity Col, Dublin.

Corson, Park, IMPETT, "Temporally-Ordered Routing Algorithm," 2006, 2 pages, www.isr.umd.edu/ISR/accomplishments/037_Routing, University of Maryland, Inst. Systems Res., Baltimore, MD, US.

International Search Report for International Application No. PCT/US07/60289 mailed Apr. 18, 2008 (3 pages).

International Preliminary Report on Patentability issued Jul. 22, 2008 (1 page) and Written Opinion mailed Apr. 18, 2008 (5 pages) for International Application No. PCT/US07/60289.

International Preliminary Report on Patentability issued Mar. 3, 2009 (1page) Written Opinion mailed Feb. 4, 2008 (6 pages) for International Application No. PCT/US07/073940.

International Search Report for International Application No. PCT/US07/073940 mailed Feb. 4, 2008 (1 page).

International Search Report for International Application No. PCT/US07/80857 mailed Mar. 21, 2008 (1 page).

International Preliminary Report on Patentability issued Jun. 3, 2009 (1 page) and Written Opinion of the International Searching Authority mailed Mar. 21, 2008 (4 pages) for International Application No. PCT/US07/80857.

* cited by examiner

METHOD AND APPARATUS FOR PASSING ROUTING INFORMATION AMONG MOBILE ROUTERS

BACKGROUND OF THE INVENTION

1. Field of the Invention

The present invention relates to passing routing information among mobile intermediate network nodes, such as in a wireless mobile ad hoc network (MANET).

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The protocol in the payload is said to be encapsulated in the protocol of the header for the payload.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are network devices that determine which communication link or links to employ to support the progress of data packets through the network. A network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A link-state protocol is an example of a routing protocol, which only exchanges control plane messages used for routing data packets sent in a different routed protocol (e.g., IP). To reduce the consumption of network resources and improve scalability, some routing protocols divide a large network up into smaller subnetworks. For example, the OSI protocol suite and the Open Shortest Path First (OSPF) routing protocol divide a network into autonomous systems and areas. An autonomous system (AS) is a portion of a network under the network administration of a single authority, such as an enterprise or Internet service provider (ISP). An AS is divided into areas. Each area is a group of contiguous subnetworks and attached end nodes specified by a network administrator, usually manually. In OSI, routers within an AS communicate with each other using an intermediate system to intermediate system (IS-IS) protocol. According to IS-IS, routing within an area (level 1 routing, not to be confused with layer 1, described above, that refers to a physical layer of the OSI model) uses link-state data that distinguishes each link on each router in the area. Routing between areas (level 2 routing) goes through a level 2 router that aggregates the addresses reachable through that level 2 router. By aggregating routing information for addresses reachable over many links of a level 2 router, the amount of network resources consumed to maintain link-state data and make routing decisions can be reduced and network scalability can be enhanced. The division of routers into areas is conventionally a manual process performed by human network administrators.

In an internetwork, networks in different autonomous systems (AS) also route data packets among each other. In general, the network nodes in an autonomous system are manually configured with an Autonomous System identifier (ASID) and pass only further summarized routing information between different AS.

Routing information for an AS is summarized at its boundaries with one or more other ASs at intermediate network nodes called border gateway nodes or border gateway (BG) routers. Routing information shared within the borders of one AS is exchanged using an interior gateway protocol (IGP). Example IGPs include the link state protocols OSPF and IS-IS described above. Another IGP, developed by Cisco Systems of San Jose, Calif. for use in its routers, is the Enhanced Interior Gateway Routing Protocol (EIGRP).

A level 3 routing protocol is used to exchange route summary and routing policy information across AS borders. For example, the Border Gateway Protocol (BGP) is a level 3 routing protocol. The BGP sends summary and policy information between adjacent boundary gateway nodes in different ASs using the External BGP (EBGP). The BGP sends summary and policy information between different boundary gateways in the same AS using the Internal BGP (IBGP).

In situations involving many mobile routers, which can join and depart a network or area using wireless communications links, routers formerly in the same area or autonomous system, may find that one or more links with that area have been broken and the only available links are with routers in other areas. Each router is configured with an area, called herein a configured area or a base area, when the router is configured for routing network communications. Mobile routers are given a base area that matches the base area given to other routers expected to operate closely together because of some affinity that can be identified According to existing routing protocols, a router, including a mobile router, rejects attempts by an adjacent router that belongs to a different area to initiate an exchange of routing information for the area. Such attempts begin, for example, in OSPF with a HELLO message that includes data that indicates the area to which the router that sends the HELLO message belongs. If that area does not match the area of the receiving router, the receiving router ignores the HELLO message, and any other messages from that area. Clearly, this approach is not suitable in circumstances where the best paths or only paths through a network are through routers belonging to a different area.

In some approaches to use such links, a wireless router is configured with multiple areas. If another router within transmission range belongs to one of the configured areas, the two routers do establish an area adjacency by exchanging HELLO messages, and subsequent routing data for that area is exchanged over that link. The node with multiple areas then maintains full routing information for each of the areas in separate tables. The router is, in essence, a member of both areas and becomes an ABR.

A problem with this approach is that the other router from the different area must communicate only through the particular router configured originally with both areas. It is difficult to ensure that routers with the correct combination of base areas are properly available and located to act as the boundary between the two areas that come together during operation. The manually configured base areas for a router not reflect the actual deployment of a mobile wireless routers, and thus be inappropriate for the available wireless links.

Based on the foregoing, there is a clear need for techniques to utilize links with a router that is in another area or autonomous system, or other domain for sharing routing information at a particular level of detail, that do not suffer the deficiencies of prior approaches.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described for assigning links that cross route information boundaries in mobile ad hoc networks. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments of the invention are described in the context of wireless routers using one type of domain for routing information: link-state flooding areas using OSPF. However, the invention is not limited to this context and protocol, but may be applied in any network and protocol that involves domains of wired or wireless mobile intermediate network nodes in a packet-switched communications network in which a different level of routing information detail is exchanged between domains from what is exchanged within a domain. For example, IS-IS or other IGP protocols may be used within a domains but a BGP summary used between domains. In some embodiments, at least some of the intermediate network nodes are wired nodes that determine their domains dynamically as they are wired together or encounter wireless nodes.

1.0 Network Overview

Figure 1:
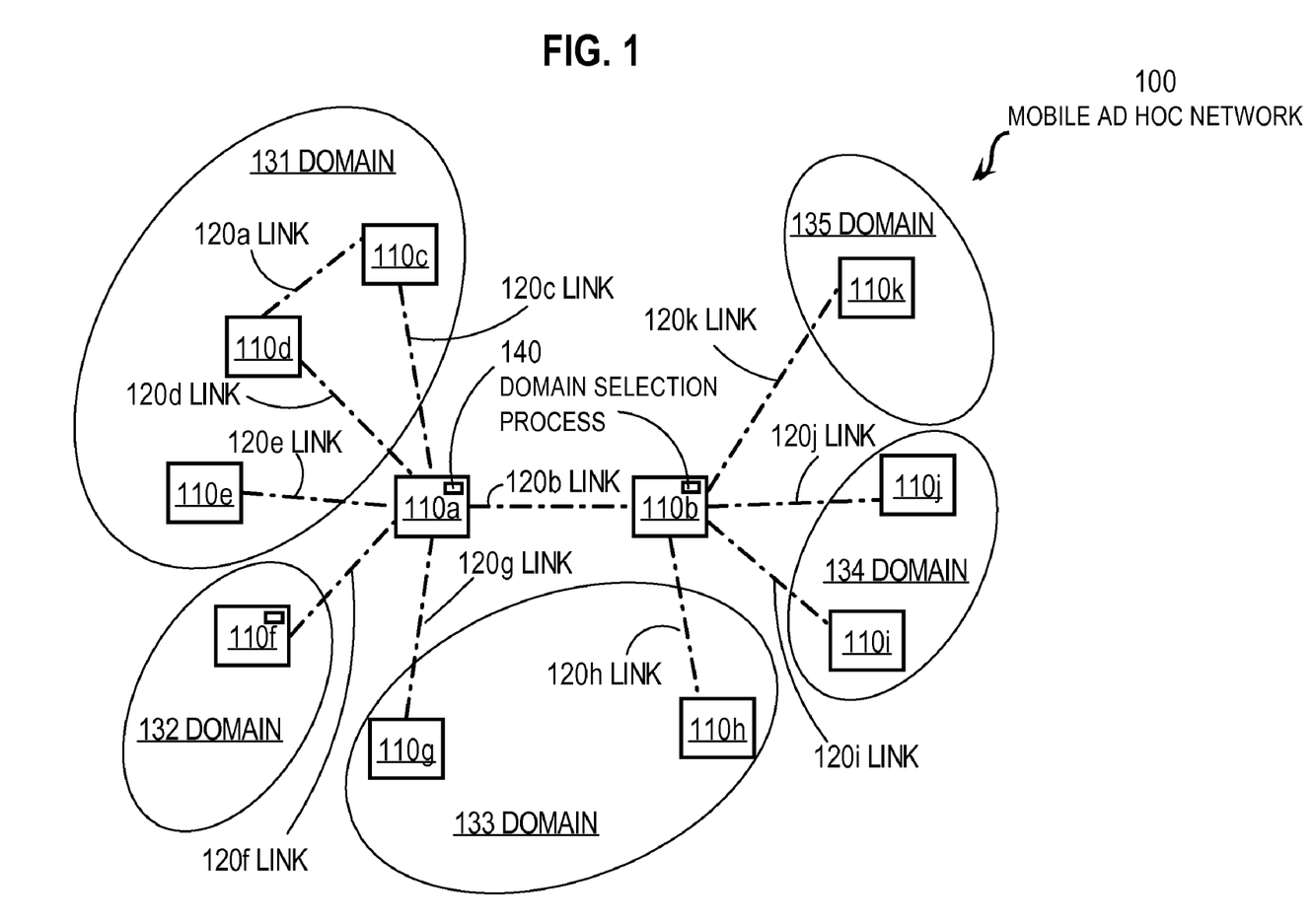
FIG. 1 is a block diagram that illustrates a mobile ad hoc network that includes multiple domains, such as OSPF flooding areas, according to an embodiment.

FIG. 1 is a block diagram that illustrates a mobile ad hoc network 100 that includes multiple domains, such as OSPF flooding areas, according to an embodiment. Network 100 includes wireless routers 110a, 110b, 110c, 110d, 110e, 110f, 110g, 110h, 110i, 110j, 110k, collectively referenced hereinafter as routers 110. The routers communicate by wireless links, including wireless links 120a, 120b, 120c, 120d, 120e, 120f, 120g, 120h, 120i, 120j, 120k, collectively referenced hereinafter as links 120. To support routing of data packets between end nodes, not shown, the routers 110 pass routing information among themselves in a routing protocol, such as the OSPF protocol. The routers are grouped into domains 131, 132, 133, 134, 135, collectively referenced hereinafter as domains 130, within which routing information is shared at the same level of detail. Between domains routing information is shared at another level of detail, typically with less detail. For example, domains 130 represent flooding areas in OSPF. Although eleven routers and 11 links in five domains are shown in network 100 of FIG. 1 for purposes of illustration, in other embodiments, a network includes more or fewer routers communicating over more or fewer links in more or fewer domains Wireless links 120 represent physical or logical links. Some wireless links use different physical channels, such as different radio frequencies, or directional antennas that spatial segregate signals at the same frequency, or time gating that reserves different time slots on the same frequency for different links. Some wireless links send all traffic on the same frequency in all directions, one data packet at a time, and logically segregate traffic onto different logical links based on a label included in the data packet; such links are called logical links.

When networks are wired together, a network administrator assigns each node to a domain or multiple domains during configuration, a manual process that grows tedious as the number of nodes increase. The same process, though tedious, works for fixed wireless routers, such as access points installed in homes and buildings. However, with mobile wireless routers, it is impractical for a human to follow the routers around and reassign them to different areas as they move— such a process would render the routers useless for mobile operations. Instead, each wireless router is configured with an area or areas, each called a configured domain, a configured area or a base area herein. Routers that are expected to be in each other's vicinity in the field are given the same configured area. A configured domain can be defined based on any affinity among nodes, such as the organization that purchases them, the zip code where they are first delivered, an age of a primary user, or any combination.

Currently, when two nodes come within wireless range on a particular link, they each send a control plane message indicating that they are a router belonging to a particular area. If both nodes belong to the same area, then the nodes share routing information as members of the same area. If either belongs to a different area, the nodes ignore routing control packets from each other.

If one of the two with different areas is an area boundary router (ABR), then the ABR sets up an inter-area link. To become an ABR, the router must belong to multiple areas and must share a common area with its neighbor. The ABR summarizes routing information for its area and passes only summary information to the other. The ABR acts as if it is a member of both areas and gets full routing information from both sides, and must maintain separate detailed routing tables for the two areas. The ABR sends only summary information from one area into the other. The link between the ABR and the foreign router then becomes a link in the foreign area.

In mobile ad hoc networks, it is difficult to determine which routers to make the ABR, where they should be deployed, and which areas they should span. In one embodiment, some nodes are configured with more than one base area and respond to HELLO messages as a member of either area. Such nodes may become ABRs. One of the base areas is preferred, and is used when the node sends an initial HELLO message. However, if the node receives a HELLO message from a router in the same area as the node's other base area, then the router responds with a new HELLO message listing the other base area. That base area then becomes associated with that link between those two nodes.

For example, it is assumed for purposes of illustration that router 110a is configured with two base areas, domain 132 and domain 131. Domain 132 is its preferred base, but in order to be able to serve as an ABR with domain 131, router 110a includes a second base domain 131. When router 110a comes into contact with router 110f in domain 132 they form domain 132. When router 110a comes in contact with router 110c in area 131, router 110a becomes an ABR between domain 132 and domain 131. Link 120c with router 110c is in domain 131. Link 120a on router 110a is thus associated with domain 131 and can not be used for domain 132 traffic.

A benefit of this arrangement is that when router 110d and then router 110e come into contact with router 110a, they also form links 120d, 120e, respectively, with router 110a. Links 120c, 120d, 120e are now links in domain 131 that are available for routing traffic within domain 131. If other links in domain 131 go down, e.g., if link 120a between routers 110c and 110d goes down, then those routers have another path to each other through router 110a on links 120c and 120d.

A shortcoming of this approach is that other available links are not used. For example router 110a is also in communication range with router 110g, in domain 133 but according to the rules of OSPF cannot form a link here and ignores all packets from domain 133. It is further assumed, for purposes of illustration, that router 110b has a preferred base domain 134 and alternative base domains 135 and 133. Router 110a is also in communication range with router 110b in domain 135, but according to the rules of OSPF cannot form a link here and ignores all control plane packets from router 110b in domain 134. Thus router 110a, and indeed all routers in domain 131 and domain 132, are unable to obtain routing information from these domains and thus cannot use paths through such domains to route data packets.

2.0 Structural Overview

According to the illustrated embodiments of the invention, routers 110 include a domain selection process, such as domain selection process 140 depicted in routers 110a, 110b, 110f, which extends the ability to automatically form links with other areas to all routers, enabling any to become an ABR. Process 140 includes a capability to learn domains from all routers within range and to select domains for such links in a way that preserves the a priori router affinities that are present without ignoring the presences of routers for which a priori affinity is lacking.

In the illustrated embodiment, routing protocol control plane packets, such as the OSPF HELLO packet, are modified to include not only a single configured domain, e.g., a single base area, as currently included in such packets, but also any other domain that shares routing information with the intermediate network node that sends the packet.

Figure 2:
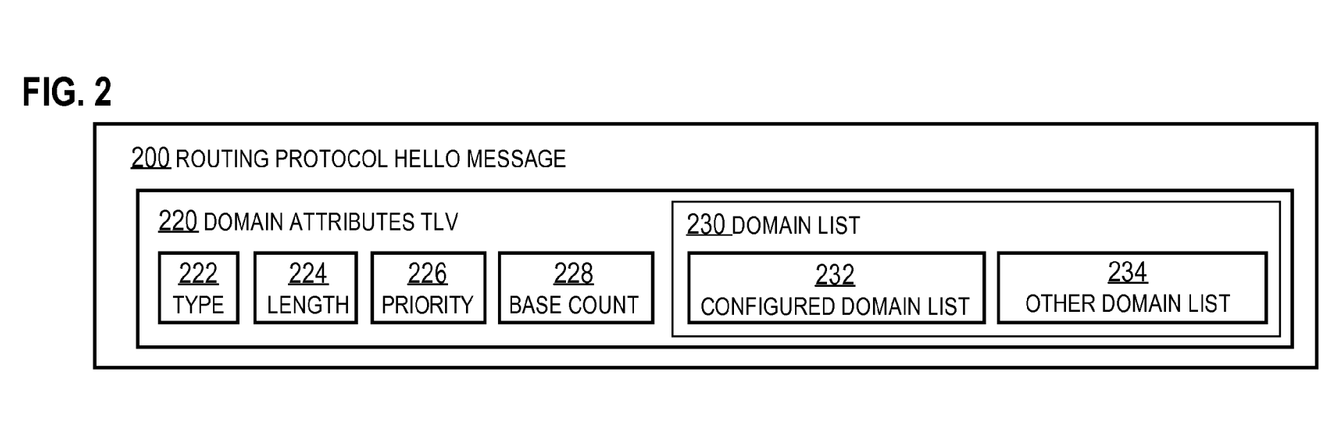
FIG. 2 is a block diagram that illustrates a routing protocol HELLO message, according to an embodiment.

FIG. 2 is a block diagram that illustrates a routing protocol HELLO message 200 as a control plane packet for a routing protocol, according to an embodiment. In the illustrated embodiment, message 200 is a modified OSPF HELLO packet with an additional type-length-value (TLV) triplet for domain attributes in a domain attributes TLV field 220. As is well known in the art, OSPF and other protocols allow optional data fields to be included as TLV fields. Each TLV field includes a type field 222, a length field 224 and a set of one or more values fields.

The type field 222 holds data that is unique for each different type of TLV field allowed in the protocol. For example, a value not in the current standard for OSPF would be used in the type field 222 and defined for domain attributes in a modified standard. The length field 224 holds data that indicates a number of octets (an octet is eight binary digits called bits) of the TLV field in total, including the size of type field 222 and length field 224. A process that receives the packet and does not recognize the value in type field 222 ignores the TLV field 220 and can tell from the length field 224 how far to skip to find the next TLV field, if any.

Following the length field 224 is the data appropriate for the type indicated in the type field 222. An illustrated format includes a priority field 226, a base count field 228 and a domain list field 230. In the illustrated embodiment, the domain list field 230 includes a configured domain list field 232 separate from other domain list field 234.

In the illustrated embodiment, a distinction is maintained between configured domains and domain that were not originally configured, but, instead, were learned since deployment, as shown in more detail below. The latter domains are called learned domains (or non-base areas) hereinafter. This distinction between configured and learned domains is maintained so that a preference for configured domains, for which there is some a priori affinity, is sustained over learned domains, which are unforeseen and more likely to be temporary. In other embodiments, this distinction is dropped and the domains are ranked in some other order. In some embodiments the order is related to some physically meaningful or measurable quantity, such as a measured persistence of contact with the domain, whether or not a distinction is maintained between configured and learned domains. Other properties used in various embodiments to order the domains include age (decreasing age to express a preference for older domains in some embodiments and increasing age to express preference for younger domains), number of members (again, in either increasing or decreasing order), among others, either alone or in combination.

The number of domains in the domain list can vary from one configured domain to multiple configured domains and multiple learned domains. Any method may be used to separate domains listed in the domain list field 230. In an example embodiment, each domain is indicated by a domain identifier (domain ID) of a fixed length (e.g., 32 octets). The number of domain IDs listed in the domain list field 230 is therefore the length of the domain attributes TLV indicated in length field 224 minus the lengths of the fields that precede the domain list field 230, the difference divided by the fixed length. Of the domains listed, the first domain IDs up to the number indicated in the base count field 228, are configured domains (e.g., base areas). In an illustrated embodiment, the lengths of the fields in domain attributes TLV 220 are as given in Table 1.

TABLE 1

Field lengths (in octets) of fields in the domain attributes TLV.

| Type | Length | Priority | Base Count | Reserved | Domain List |
|---|---|---|---|---|---|
| 16 | 16 | 8 | 8 | 16 | integer multiple of 32 |

In the illustrated embodiment, the domain IDs in each of the configured domain list field 232 and the learned domain list field 234 are ordered by preference. Thus the preferred domain is the first configured domain for which the domain ID is listed first in the configured domain list 232.

Although message and fields are shown in FIG. 2 as contiguous blocks of data arranged in a particular order for purposes of illustration, in other embodiments one or more messages, fields or portions thereof are arranged in a different order in one or more messages.

3.0 Method for Assigning a Link to a Domain

According to the illustrated embodiment, a domain is automatically selected from the domains listed in the domain list fields 230 of the routing protocol control packets exchanged when the link is discovered, without human involvement. In some embodiments not all wireless signals received at an intermediate node are considered for a link to be used for routing. Some wireless signals are redundant or undesirable in some other way. It is assumed for purposes of illustration that such filtering is done and undesirable signals are dropped from consideration before performing the steps illustrated in this section.

In some embodiments, any domain used by either router is selected as the domain for the link. In some embodiments all domains are selected. In some embodiments only one domain is selected for the link. In some embodiments, more than one but less than all are selected.

Figure 3:
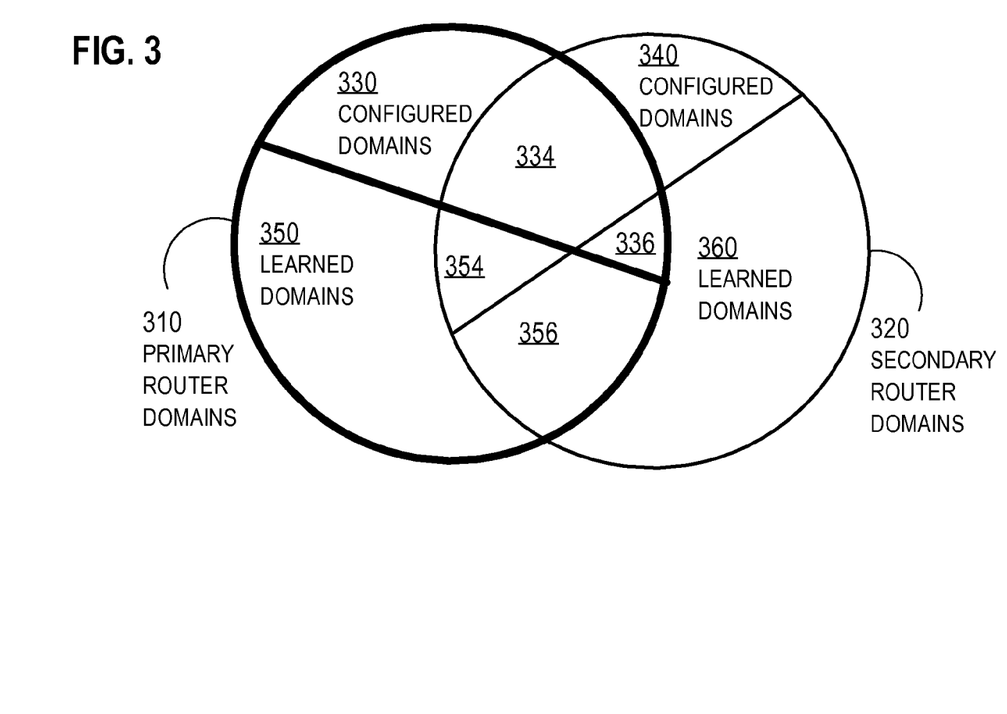
FIG. 3 is a Venn diagram that illustrates possible intersections in multiple domains for two routers connected by a link, according to an embodiment.

In the illustrated embodiment there is a preference for domains shared between the two nodes, and a greater preference for a configured domain for the nodes than for a learned domain. In other embodiments automatic selections is based on other preferences. FIG. 3 is a Venn diagram that illustrates possible intersections in multiple domains for two routers connected by a link, according to an embodiment. Of the two routers, one is considered primary and the other is considered non-primary, or secondary. FIG. 3 depicts a primary domain set 310 of domains currently on the primary router, and a secondary domain set 320 of domains currently on the secondary router. Of the primary domain set 310, a subset of one or more domains are in a primary configured domain set 330 and the rest are in a primary learned domain set 350 of zero or more domains. Similarly, of the secondary domain set 320, a subset of one or more domains are in a secondary configured domain set 340 and the rest are in a secondary learned domain set 360 of zero or more domains.

The preference in the illustrated embodiment is for one or more domains in an intersection 334 of the configured domain sets. If this intersection set is empty, the next preference is for an intersection set 336 of the primary configured domain set with the secondary learned domain set. If this intersection set is also empty, the next preference is for the intersection 354 of the secondary configured domain set with the primary learned domain set. If this intersection set is also empty, the next preference is for the intersection 356 of the learned domain sets. And, if this intersection set is also empty, then the preference is for the at least one domain in the primary configured domain set 330.

Figure 4A:
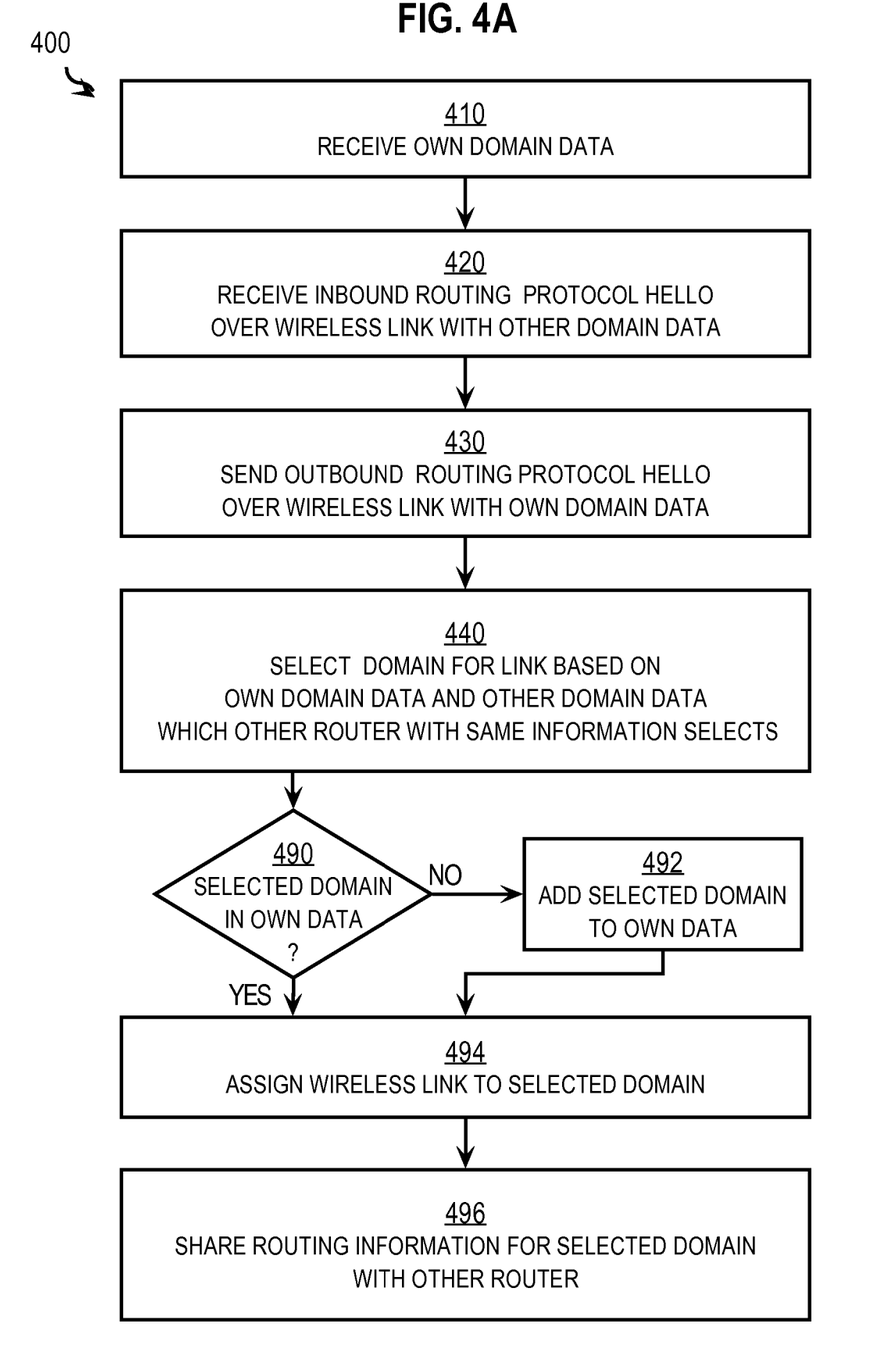
FIG. 4A is a flow diagram that illustrates at a high level a method for automatically assigning a wireless communications link to a domain, according to an embodiment.

FIG. 4A is a flow diagram that illustrates at a high level a method 400 for automatically assigning a wireless communications link to a domain, according to an embodiment. Although steps are shown in FIG. 4A and subsequent flow diagram FIG. 4B in a particular order for purposes of illustration, in other embodiments one or more steps are performed in a different order or overlapping in time on one or more processors executing in series or in parallel, or one or more steps are omitted or, or the steps are changed in some combination of ways.

In step 410 a local router receives its own domain data. The own domain data includes at least one configured domain, such as a one base area for OSPF. In some embodiments, the own data includes several configured domains. Any method may be used to receive the data, including, but not limited to predefined data stored within source code or in files stored with executable code ("default values") or in files or a database accessible to the process, human input either in response to prompts from the process or independently of prompts, or from data included in a message sent by another process, either unsolicited or in response to a request message. In some embodiments one or more learned domains, learned during step 492 described below, are included in own domain data.

In step 420 an inbound routing protocol control plane packet, such a modified OSPF HELLO message 200 depicted in FIG. 2, is received over a wireless link with another router. This packet includes other domain data that indicates domain IDs for one or more domains for the other router, including at least one configured domain for the other router.

In step 430 an outbound routing protocol control packet, such a modified OSPF HELLO message 200, is sent over the wireless link with the other router. This data packet includes domain IDs for the domains listed in the own domain data, including at least one configured domain for the local router. In some embodiments, step 430 is omitted. In some embodiments step 430 occurs before step 420.

In step 440 a particular domain is selected for the link based on the own domain data and other domain data. The selection is made in such a way that the other router would make the same selection with the same data, even though own data and other data have reversed meanings for the other router. This feature is desirable so that both routers come to the same selection independently without further negotiating. Step 440 is described in more detail below with reference to FIG. 4B. After step 440, control passes to step 490.

In step 490, it is determined whether the particular selected domain is included in the own data received in step 410. If so, control passes to step 494 described below. However, if it is determined in step 490 that the particular domain selected is not included in own data, then control passes to step 492. In step 492, the particular selected domain is added to own domain data as a learned domain. Step 492 is part of step 410 to receive own data. In some embodiments, step 492 includes preparing to add routing data and routing tables for the selected area. Control passes to step 494.

In step 494, the wireless link over which the inbound routing protocol control packet was received is assigned to the particular selected domain. This link becomes part of the routing information for the selected domain on the router. Control then passes to step 496.

In step 496, routing information for the selected domain is shared with the other router over the wireless link at the level of detail appropriate for the domain. In some embodiments, step 496 includes deleting a link when traffic stops on that link, for example after an extended time with no "keep alive" messages received over the link. If the deleted link is the last link for a learned domain, step 486 includes deleting the learned domain from the own data.

When a new link comes up, control passes to step 420 to receive a new inbound routing protocol control plane packet. In this way, each router with this process may automatically become an ABR for a new domain when a link is developed with a router of a different domain. If the selected domain is one of the configured domains, then the router might not need to expend the resources to become an ABR. This capability is especially desirable for mobile wireless routers in ad hoc networks.

In some embodiments, as described next, the selection is made with a preference for domains that appear in the domain data for both routers, i.e. for shared or common domains. This leads to more intra-domain routes for routers in the common domain, reduces the amount of processing from that required for an ABR, and provides benefits not provided by a strict adherence to use of configured domains only.

Figure 4B:
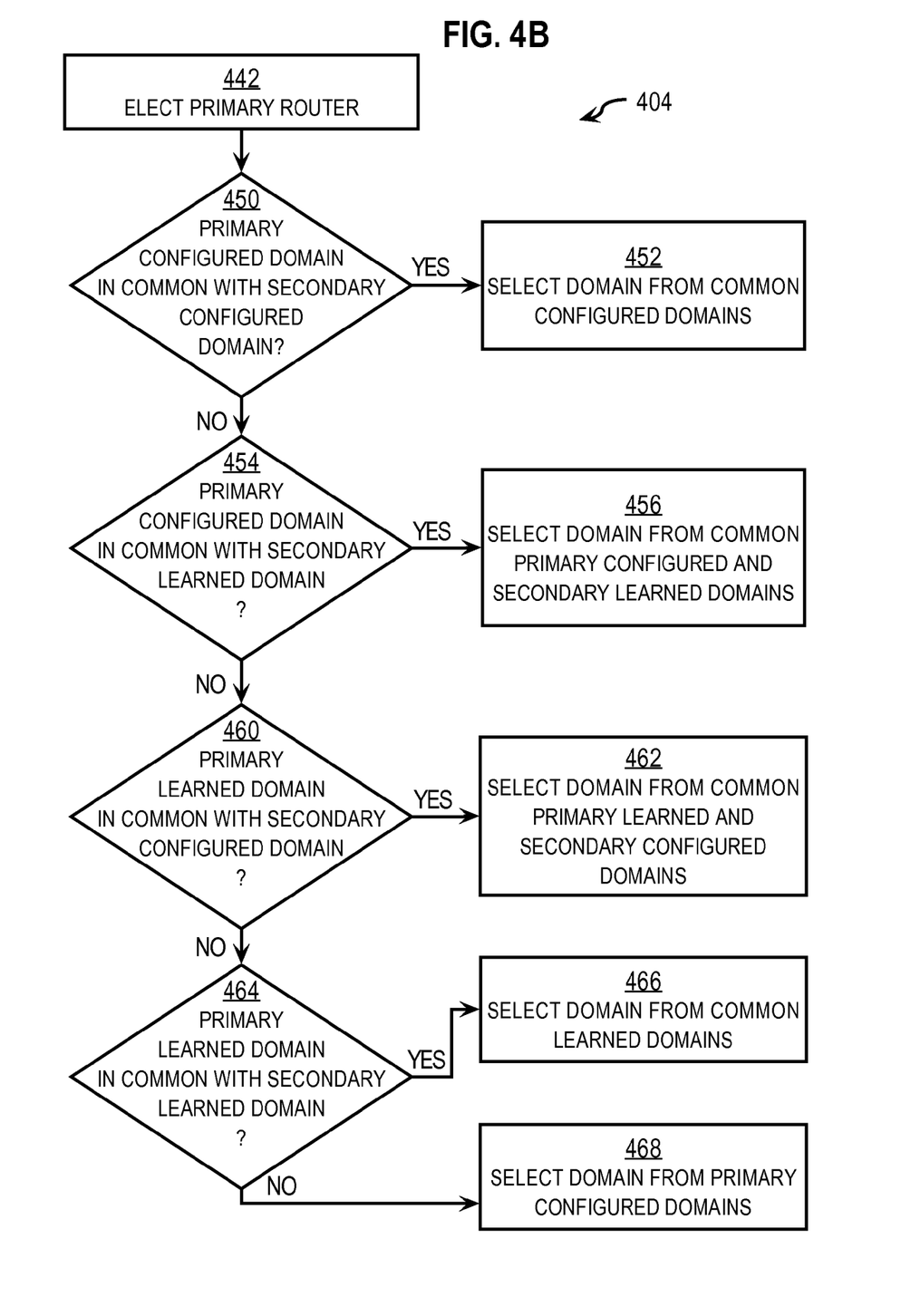
FIG. 4B is a flow diagram that illustrate in more detail a step of the method of FIG. 4A, according to an embodiment.

FIG. 4B is a flow diagram that illustrate in more detail step 440 of the method of FIG. 4A, according to an embodiment 404. For purposes of illustration, it is assumed that router 110*a* and router 110*b* just came into contact and exchanged HELLO messages 200 that list their configured and learned domains. It is further assumed that router 110*a* has configured domain 132 and learned domains 131 and 133 which are valued by router 110*a* in that order because of the number of those links or the rate at which those links are used or some other measure of value. It is further assumed that router 110*b* has configured domain 134 and learned domains 135 and 133 which are valued in that order. This domain data for each router is summarized in Table 2.

TABLE 2

Example domain data for routers exchanging HELLO messages.

| | Router 110a | Router 110b |
|---|---|---|
| configured domains | 132 | 134 |
| learned domains | 131, 133 | 135, 133 |

In step 442 a primary router is elected. Either the local router or the adjacent router may be the primary router. The primary router is the router from which to select a domain if there is not a common domain. During process 404, the same domain is selected by both routers without further negotiations because some protocols ban further negotiating with routers that are not from the same domain. The obvious choice, to make the local router the primary router, may lead to the two routers making different selections of a domain, and communications will not be advanced. In some embodiments, step 442 includes selecting the router with the larger router identifier (router ID) as the primary router. In some embodiments, step 442 includes selecting the router with the smaller router ID as the primary router. Any method may be used to determine the router ID. In some embodiments, the router ID is a configured value. In some embodiments a unique media access control (MAC) number across all manufacturers of network equipment is used as the router ID. In some embodiments, an IP address for a router is used as the router ID. In the illustrated embodiment, the router ID is included in the control plane packet, e.g. HELLO message 200, exchanged to determine if there is a common domain. For example a MAC value is often included in a link layer (layer 2) header and an IP address is included in an internetwork layer (layer 3) header both present in control plane packets for a routing protocol. In some embodiments, a router ID field is added to the domain attributes TLV field 220. After exchange of the inbound and outbound messages, each router knows the router ID of the other and the selection of the primary router can be made uniformly in both routers.

In some embodiments, it is not desirable that the primary router be chosen arbitrarily on a router ID. Some routers may have more processing power; and it is preferred that a domain be selected from the less capable router so that the more capable router would become the ABR if the domain selected is new to the more capable router. Some routers may be preferred as primary for other reasons. For example, some configured areas may be preferred and a router with the preferred configured area is preferred as the primary router. In various embodiments other considerations are made to determine the primary router, such as the router which has been in the current location for a longer (or shorter) time, the router that has more (or fewer) peers, the router that has listed more (or fewer) domains, among others. To influence the election of a primary router, in some embodiments, the router with the higher priority inserted in the priority field 226 of the domain attributes TLV field 220 is elected the primary router. In these embodiments, the primary router is elected based on the router ID only if the priorities of both routers are the same. In these embodiments, routers are configured with a domain priority attribute such as when they are configured with their configured domains.

It is assumed for purposes of illustration that router 110*a* has a higher priority because router 110*b* has more processing power, and thus that router 110*a* is elected the primary router.

In step 450, it is determined whether there is a common domain among the configured domains of both routers. That is, it is determined whether the set 334 depicted in FIG. 3 has at least one member. If so, control passes to step 452.

In step 452 one or more domains are selected from the set 334 of domains that are configured on both routers. In some embodiments, only one domain is allowed per link. In these embodiments the first member of set 334 listed in the domain data of the primary router is selected. Because both routers know which is the primary router and both have exchanged HELLO messages with domains listed in a desired order, therefore both routers know the order in which domains are listed on the primary router. So both routers make the same selection. In some embodiments there is a limit other than one domain per link. In these embodiments the first members of set 334 listed in the domain data of the primary router up to the limit are selected. In some embodiments there is no limit on the domains per link. In some of these embodiments all the domains in the set 334 are selected for the link. In embodiments in which there is a limit on the number of domains to which a link can be assigned, the order of the domains listed in the domain data of the primary router matters and that order is considered when the message, like message 200, that includes the domain data is formed.

For the illustrated embodiment, the members of the various common sets depicted in FIG. 3 are enumerated in Table 3. As can be seen in Table 3, for this embodiment there is

TABLE 3

Example common domains.

| | Set 334 | Set 336 | Set 354 | Set 356 | residual primary configured domains |
|---|---|---|---|---|---|
| member domains | — | — | — | 133 | 132 | no domain in set 334. If it is assumed for purposes of illustration that the configured domain 134 for router 110b is the same as the configured domain 132 of router 110a, then this domain 132 would be in set 334 and selected as the domain for the link 120b. Routers 110a, 110b, 110f, 110i and 110j would be in the same domain 132 with intra-area routes by virtue of link 120b. This is similar to the result achieved with current approaches that only allow links with routers in the same base areas. However, it is different in that the base area was selected among multiple base and non-base areas on each router that are exchanged in each HELLO message. Current approaches only allow one domain in a HELLO message and only routers manually configured as an ABR with multiple domains have more than one domain.

If it is determined in step 452 that there is not a common domain among the configured domains of both routers, then control passes to step 454. In step 454, it is determined whether there is a common domain among the configured domains of the primary router and the learned domains of the secondary router. That is, it is determined whether the set 336 depicted in FIG. 3 has at least one member. If so, control passes to step 456.

In step 456 one or more domains are selected from the set 336 of domains that are configured on the primary router and learned on the secondary router. The number selected in various embodiments depends on the number allowed per link in the protocol used. Both routers know the order in which domains are listed by the primary router, so both routers make the same selection.

As can be seen in Table 3 for the illustrated embodiment, no domain is in set 336. If it is assumed for purposes of illustration that the learned domain 135 for router 110b is the same as the configured domain 132 of router 110a, then this domain 132 would be in set 336 and selected as the domain for the link 120b. Routers 110a, 110b, 110f, and 110k would be in the same domain 132 with intra-area routes by virtue of link 120b. This is a useful result not achieved with current approaches that only allow links with routers in the same base areas.

If it is determined in step 454 that there is not a common domain among the configured domains of the primary router and the learned domains of the secondary router, then control passes to step 460. In step 460, it is determined whether there is a common domain among the configured domains of the secondary router and the learned domains of the primary router. That is, it is determined whether the set 354 depicted in FIG. 3 has at least one member. If so, control passes to step 462.

In step 462 one or more domains are selected from the set 354 of domains that are configured on the secondary router and learned on the primary router. The number selected in various embodiments depends on the number allowed per link in the protocol used. Both routers know the order in which domains are listed by the primary router, so both routers make the same selection.

As can be seen in Table 3 for the illustrated embodiment, no domain is in set 354. If it is assumed for purposes of illustration that the configured domain 134 for router 110b is the same as the learned domain 131 of router 110a, then this domain 134 would be in set 354 and selected as the domain for the link 120b. Routers 110a, 110b, 110c, 110d, 110e, 110i, and 110j would be in the same domain 134 with intra-area routes by virtue of link 120b. This is a useful result not achieved with current approaches that only allow links with routers in the same base areas.

If it is determined in step 460 that there is not a common domain among the configured domains of the secondary router and the learned domains of the primary router, then control passes to step 464. In step 464, it is determined whether there is a common domain among the learned domains of both routers. That is, it is determined whether the set 356 depicted in FIG. 3 has at least one member. If so, control passes to step 466.

In step 466 one or more domains are selected from the set 356 of domains that are learned on both routers. The number selected in various embodiments depends on the number allowed per link in the protocol used. Both routers know the order in which domains are listed by the primary router, so both routers make the same selection. As can be seen in Table 3 for the illustrated embodiment, domain 133 is in set 356. Thus domain 133 is selected as the domain for the link 120b. Routers 110a, 110b, 110g, and 110h are in the same domain 133 with intra-area routes by virtue of link 120b. This is a useful result not achieved with current approaches that only allow links with routers in the same base areas.

If it is assumed for purposes of illustration that the learned domain 135 for router 110b is the same as the learned domain 131 of router 110a, then this domain 131 would also be in set 356 and selected as a second domain for the link 120b in some embodiments. Routers 110a, 110b, 110c, 110d, 110e and 110k would be in the same domain 131 with intra-area routes by virtue of link 120b. This is a useful result not achieved with current approaches that only allow links with routers in the same base areas or only one area per link.

If it is determined in step 464 that there is not a common domain among the learned domains of both routers, then control passes to step 468.

In step 468 one or more domains are selected from the set 330 of domains that are configured on the primary router. There is at least one such domain. The number selected in various embodiments depends on the number allowed per link in the protocol used. Both routers know the order in which domains are listed by the primary router, so both routers make the same selection.

For example, if it is assumed for purposes of illustration that domain 133 is not learned by router 110b, then set 356 is empty and a configured domain 132 for primary router 110a, as shown in Table 2, is selected as the domain for the link 120b. Router 110b attaches to domain 132 and may become an ABR for domain 132. Routers 110a, 110b and 110f would be in the same domain 132 with intra-area routes by virtue of link 120b. This is a useful result not achieved with current approaches that only allow links with routers in the same base areas. Routes that are not available in a prior approach through domains 134 and 135 are now available (as summarized routing information at a different level of detail than intra-area routing information) to routers in domains 131, 132 and 133 through ABR 110b.

4.0 Implementation Mechanisms—Hardware Overview

Figure 5:
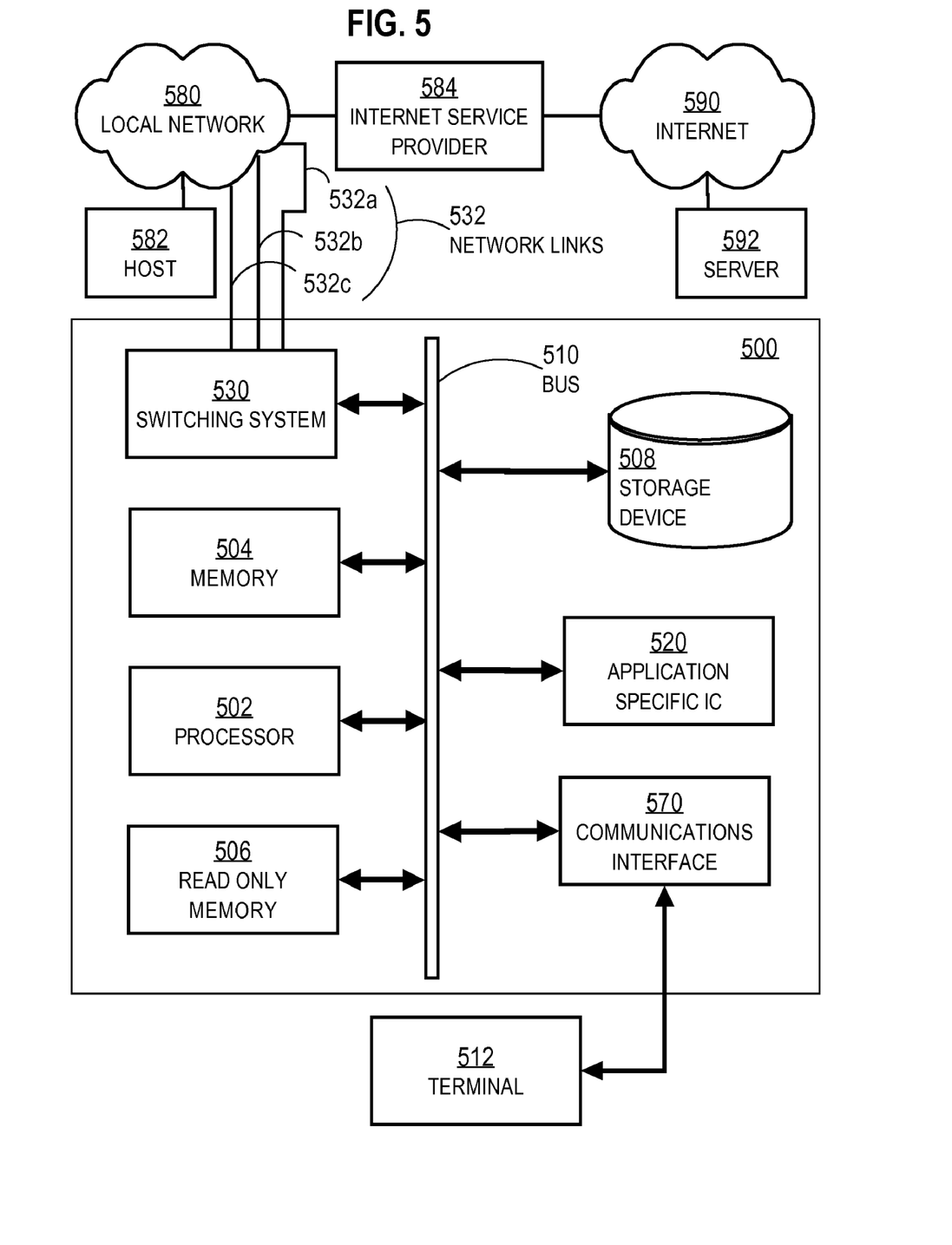
FIG. 5 is a block diagram that illustrates a router upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 5 10. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
  receiving first domain data that indicates a set of one or more domains of which a first mobile router is a member, wherein
    each domain is a collection of one or more routers that share uniform routing information at a particular level of detail,
    the first domain data indicates at least one configured domain for the first mobile router, and
    a configured domain is a domain assigned to a router when the router is configured for performing routing operations;
  receiving from a second mobile router over a particular link an inbound control plane packet that lists second domain data that indicates a set of one or more domains of which the second mobile router is a member, wherein the packet is part of an open shortest path first (OSPF) HELLO packet that includes a type length value (TLV) for the one or more domains of which the second mobile router is a member, and wherein
    the second domain data includes at least one configured domain for the second mobile router; and
  automatically selecting a particular domain from the first domain data and the second domain data without further communications with the second mobile router, wherein the second mobile router would independently select its particular domain automatically in a similar manner without further communications with the first mobile router, wherein the first mobile router includes multiple learned domains that are organized in a hierarchy such that the domains are ranked higher based on a measured persistence of contact with each of the domains, and wherein a primary router is elected for the first and second mobile routers;

assigning the particular link to the particular domain; and sharing routing information for the particular domain between the first mobile router and the second mobile router over the particular link, wherein said step of selecting the particular domain further comprises, if it is determined that the common set includes more than zero domains, then performing the steps of:

determining whether the common set includes a configured domain of at least one of the first mobile router and the second mobile router;

if it is determined that the common set includes the configured domain, then selecting the particular domain to include the configured domain from the common set, and wherein said step of selecting the particular domain further comprises, if it is determined that the common set includes the configured domain, then performing the steps of:

determining whether the common set includes a configured domain of the primary router that is also a configured domain of a secondary router of the first mobile router and the second mobile router, wherein the secondary router is different from the primary router; and if it is determined that the common set includes the configured domain of the primary router that is also a configured domain of the secondary router, then selecting the particular domain to include from the common set the configured domain of the primary router that is also the configured domain of the secondary router.

2. A method as recited in claim 1, further comprising sending over the particular link an outbound control plane packet that lists the first domain data.

3. A method as recited in claim 1, further comprising:

determining whether the particular domain is indicated by data in the first domain data; and if it is determined that the particular domain is not indicated by data in the first domain data, then adding data that indicates the particular domain to the first domain data, whereby a learned domain for the first mobile router is added to the first domain data.

4. A method as recited in claim 3, said step of adding data that indicates the particular domain to the first domain data further comprising adding, to the first domain data, data that indicates the particular domain is a learned domain of the first mobile router.

5. A method as recited in claim 1, said step of selecting the particular domain further comprising the steps of:

determining a common set of zero or more domains that are indicated both in the first domain data and the second domain data; and determining whether the common set includes more than zero domains; and if it is determined that the common set includes more than zero domains, then selecting the particular domain from the common set.

6. A method as recited in claim 5, said step of selecting the particular domain further comprising, if it is determined that the common set includes more than zero domains, then performing the steps of:

determining whether the common set includes a plurality of domains; and if it is determined that the common set includes a plurality of domains, then selecting the particular domain to include a plurality of domains from the common set.

7. A method as recited in claim 6, said step selecting the particular domain to include a plurality of domains from the common set further comprising, if it is determined that the common set includes a plurality of domains, then selecting the particular domain to include all of the common set.

8. A method as recited in claim 5, said step of selecting the particular domain further comprising, if it is determined that the common set includes more than zero domains, then performing the steps of:

determining whether the common set includes a configured domain of at least one of the first mobile router and the second mobile router; and if it is determined that the common set includes a configured domain, then selecting the particular domain to include the configured domain from the common set.

9. A method as recited in claim 2, said step of selecting a particular domain further comprising the steps of:

determining the primary router of the first mobile router and the second mobile router based on information in the outbound control plane packet and the inbound control plane packet; and selecting the particular domain further comprising selecting the particular domain based on an order listed in a primary domain data of the first domain data and the second domain data, wherein the primary domain data indicates the set of one or more domains to which the primary mobile router is connected.

10. A method as recited in claim 9, said step of selecting the particular domain based on an order listed in the primary domain data further comprising the steps of:

determining a common set of zero or more domains that are indicated both in the first domain data and the second domain data; and selecting the particular domain of the common set that is listed first in the primary domain data.

11. An apparatus, comprising:

means for receiving first domain data that indicates a set of one or more domains of which a first mobile router is a member, wherein each domain is a collection of one or more routers that share uniform routing information at a particular level of detail, the first domain data indicates at least one configured domain for the first mobile router, and a configured domain is a domain assigned to a router when the router is configured for performing routing operations;

means for receiving from a second mobile router over a particular link an inbound control plane packet that lists second domain data that indicates a set of one or more domains of which the second mobile router is a member, wherein the packet is part of an open shortest path first (OSPF) HELLO packet that includes a type length value (TLV) for the one or more domains of which the second mobile router is a member, and wherein the second domain data includes at least one configured domain for the second mobile router; and means for selecting a particular domain from the first domain data and the second domain data without further communications with the second mobile router, wherein the second mobile router would independently select its particular domain automatically in a similar manner without further communications with the first mobile router, wherein the first mobile router includes multiple learned domains that are organized in a hierarchy such that the domains are ranked higher based on a measured persistence of contact with each of the domains, and wherein a primary router is elected for the first and second mobile routers;

means for assigning the particular link to the particular domain; and means for sharing routing information for the particular domain between the first mobile router and the second mobile router over the particular link, wherein said selecting the particular domain further comprises, if it is determined that the common set includes more than zero domains, then performing the steps of:

determining whether the common set includes a configured domain of at least one of the first mobile router and the second mobile router;

if it is determined that the common set includes the configured domain, then selecting the particular domain to include the configured domain from the common set, and wherein said selecting the particular domain further comprises, if it is determined that the common set includes the configured domain, then performing the steps of:

determining whether the common set includes a configured domain of the primary router that is also a configured domain of a secondary router of the first mobile router and the second mobile router, wherein the secondary router is different from the primary router; and if it is determined that the common set includes the configured domain of the primary router that is also a configured domain of the secondary router, then selecting the particular domain to include from the common set the configured domain of the primary router that is also the configured domain of the secondary router.

12. An apparatus, comprising:

a network interface that is in communication with a packet-switched network for communicating therewith a data packet;

one or more processors;

a computer-readable medium; and one or more sequences of instructions stored in the computer-readable medium, which, when executed by the one or more processors, causes the one or more processors to carry out the steps of:

receiving first domain data that indicates a set of one or more domains of which the apparatus is a member, wherein each domain is a collection of one or more routers that share uniform routing information at a particular level of detail;

the first domain data indicates at least one configured domain for the apparatus, and a configured domain is a domain assigned to a router when the router is configured for performing routing operations;

receiving, from a mobile router over a particular link on the network interface, an inbound control plane packet that lists second domain data that indicates a set of one or more domains of which the mobile router is a member, wherein the packet is part of an open shortest path first (OSPF) HELLO packet that includes a type length value (TLV) for the one or more domains of which the second mobile router is a member, and wherein the second domain data includes at least one configured domain for the mobile router; and selecting a particular domain from the first domain data and the second domain data without further communications with the second mobile router, wherein the mobile router would independently select its particular domain automatically in a similar manner without further communications with the first mobile router, wherein the first mobile router includes multiple learned domains that are organized in a hierarchy such that the domains are ranked higher based on a measured persistence of contact with each of the domains, and wherein a primary router is elected for the first and second mobile routers;

assigning the particular link to the particular domain; and sharing routing information for the particular domain between the apparatus and the mobile router over the particular link, wherein said step of selecting the particular domain further comprises, if it is determined that the common set includes more than zero domains, then performing the steps of:

determining whether the common set includes a configured domain of at least one of the first mobile router and the second mobile router;

if it is determined that the common set includes the configured domain, then selecting the particular domain to include the configured domain from the common set, and wherein said step of selecting the particular domain further comprises, if it is determined that the common set includes the configured domain, then performing the steps of:

determining whether the common set includes a configured domain of the primary router that is also a configured domain of a secondary router of the first mobile router and the second mobile router, wherein the secondary router is different from the primary router; and if it is determined that the common set includes the configured domain of the primary router that is also a configured domain of the secondary router, then selecting the particular domain to include from the common set the configured domain of the primary router that is also the configured domain of the secondary router.

13. An apparatus as recited in claim 12, wherein execution of the one or more sequences of instructions further causes the one or more processors to carry out the step of sending over the particular link an outbound control plane packet that lists the first domain data.

14. An apparatus as recited in claim 12, wherein execution of the one or more sequences of instructions further causes the one or more processors to carry out the steps of:

determining whether the particular domain is indicated by data in the first domain data; and if it is determined that the particular domain is not indicated by data in the first domain data, then adding data that indicates the particular domain to the first domain data, whereby a learned domain for the apparatus is added to the first domain data.

15. An apparatus as recited in claim 14, said step of adding data that indicates the particular domain to the first domain data further comprising adding, to the first domain data, data that indicates the particular domain is a learned domain of the apparatus.

16. An apparatus as recited in claim 12, said step of selecting the particular domain further comprising the steps of:
- determining a common set of zero or more domains that are indicated both in the first domain data and the second domain data; and
- determining whether the common set includes more than zero domains; and
- if it is determined that the common set includes more than zero domains, then selecting the particular domain from the common set.

17. An apparatus as recited in claim 16, said step of selecting the particular domain further comprising, if it is determined that the common set includes more than zero domains, then performing the steps of:
- determining whether the common set includes a plurality of domains; and
- if it is determined that the common set includes a plurality of domains, then selecting the particular domain to include a plurality of domains from the common set.

18. An apparatus as recited in claim 17, said step selecting the particular domain to include a plurality of domains from the common set further comprising, if it is determined that the common set includes a plurality of domains, then selecting the particular domain to include all of the common set.

19. An apparatus as recited in claim 16, said step of selecting the particular domain further comprising, if it is determined that the common set includes more than zero domains, then performing the steps of:
- determining whether the common set includes a configured domain of at least one of the apparatus and the mobile router; and
- if it is determined that the common set includes a configured domain, then selecting the particular domain to include the configured domain from the common set.

20. An apparatus as recited in claim 13, said step of selecting a particular domain further comprising the steps of:
- determining the primary router of the apparatus and the mobile router based on information in the outbound control plane packet and the inbound control plane packet; and
- selecting the particular domain further comprising selecting the particular domain based on an order listed in a primary domain data of the first domain data and the second domain data, wherein the primary domain data indicates the set of one or more domains to which the primary router is connected.

21. An apparatus as recited in claim 20, said step of selecting the particular domain based on an order listed in the primary domain data further comprising the steps of:
- determining a common set of zero or more domains that are indicated both in the first domain data and the second domain data; and
- selecting the particular domain of the common set that is listed first in the primary domain data.

* * * * *